(12) United States Patent
Meintschel et al.

(10) Patent No.: US 7,377,243 B2
(45) Date of Patent: May 27, 2008

(54) ADJUSTING MECHANISM FOR A CAMSHAFT ARRANGEMENT

(75) Inventors: Jens Meintschel, Esslingen (DE); Thomas Stolk, Kirchheim (DE); Alexander Von Gaisberg-Helfenberg, Beilstein (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/584,336

(22) Filed: Oct. 20, 2006

(65) Prior Publication Data

US 2007/0056541 A1 Mar. 15, 2007

Related U.S. Application Data

(63) Continuation-in-part of application No. PCT/EP2005/003814, filed on Apr. 12, 2005.

(51) Int. Cl.
*F01L 1/34* (2006.01)

(52) U.S. Cl. .................. 123/90.17; 123/90.31; 464/160; 74/640

(58) Field of Classification Search .......... 123/90.15, 123/90.17, 90.16, 90.18, 90.27, 90.31; 464/1, 464/160; 74/640, 661
See application file for complete search history.

(56) References Cited

U.S. PATENT DOCUMENTS

| 2,851,851 | A | 9/1958 | Miller |
| 4,305,352 | A | 12/1981 | Oshima et al. |
| 6,189,498 | B1 | 2/2001 | Yonezawa et al. |

FOREIGN PATENT DOCUMENTS

| DE | 40 27 312 | 3/1992 |
| DE | 40 36 010 | 5/1992 |
| DE | 41 33 408 | 4/1993 |
| DE | 297 14 816 | 12/1997 |
| DE | 197 02 670 | 3/1998 |
| DE | 198 20 063 | 11/1999 |
| DE | 100 06 365 | 8/2001 |
| EP | 0 254 058 | 1/1988 |
| EP | 624717 A1 * | 11/1994 |
| FR | 2 809 152 | 11/2001 |
| WO | WO 88/07125 | 9/1988 |
| WO | WO 02/101207 | 12/2002 |

\* cited by examiner

*Primary Examiner*—Ching Chang
(74) *Attorney, Agent, or Firm*—Klaus J. Bach

(57) ABSTRACT

In an adjusting mechanism which is connected to first and second camshafts of a camshaft drive arrangement including a control device for adjusting the phase position of at least one of the camshafts relative to a crankshaft of an internal combustion engine, and having a drive device for driving the camshaft arrangement, a first partial mechanism for driving the first camshaft and a second partial mechanism for driving the second camshaft are provided so as to be driven in parallel by means of a common drive device for adjusting the angular position of the first and second camshafts relative to the crankshaft of the engine.

13 Claims, 5 Drawing Sheets

ADJUSTING MECHANISM FOR A CAMSHAFT ARRANGEMENT

This is a Continuation-In-Part Application of pending international patent application PCT/EP2005/003814 filed Apr. 12, 2005 and claiming the priority of German patent application 10 2004 018 947.1 filed Apr. 20, 2004.

BACKGROUND OF THE INVENTION

The invention relates to an adjusting mechanism for adjusting the phase relationship between a camshaft and a crankshaft driving the camshaft.

It is known in motor vehicles to utilize variable valve control to optimize fuel consumption and engine performance. For this purpose, for example, the actuation of inlet and outlet valves is varied as a function of engine operating conditions. In engines, a camshaft is gear-driven by a crankshaft via a drive belt or chain, either of which extends around gears of an intake and/or exhaust camshaft and a crankshaft operating the intake and exhaust valves. To vary the valve actuation, it is possible for example to vary the phase position of one camshaft relative to the crankshaft or relative to the other camshaft. Such arrangements for adjusting the phase position conventionally require a relatively large amount of installation space, which is difficult to provide in modern vehicles in which a plurality of units are arranged. In addition, the scarcely available installation space is further restricted by the increasing demands for passive vehicle safety.

An adjusting mechanism is known from the disclosure DE 100 06 365 A1, said adjusting mechanism being formed by planetary gear sets whose elements are concentrated substantially axially on two camshafts which are connected by means of the adjusting drive. Here, one drive wheel drives a first camshaft of the adjusting mechanism via a traction means, said first camshaft then driving a further camshaft which is also part of the adjusting mechanism. The drive wheel also drives a third camshaft which is not connected to the adjusting mechanism.

It is the principle object of the present invention to provide as compact an adjusting mechanism as possible for a camshaft drive arrangement.

SUMMARY OF THE INVENTION

In an adjusting mechanism which is connected to first and second camshafts of a camshaft drive arrangement including a control device for adjusting the phase position of at least one of the camshafts relative to a crankshaft of an internal combustion engine, and having a drive device for driving the camshaft arrangement, a first partial mechanism for driving the first camshaft and a second partial mechanism for driving the second camshaft are provided so as to be driven in parallel by means of a common drive device for adjusting the angular position of the first and second camshafts relative to the crankshaft of the engine.

Here, the drive wheel is preferably simultaneously in engagement with at least one planet gear of each partial mechanism. In a first preferred embodiment, the two partial transmissions can be embodied as a dual planetary gear set. In a second preferred embodiment, the partial mechanisms can be embodied as an eccentric dual planetary gear set. Here, by using addendum modification, gearwheels with different numbers of teeth can be arranged on the same diameter. The adjusting mechanism according to the invention is small and compact and makes it possible to adjust two camshafts in a weight-optimized and installation space-optimized manner for opening and closing intake valves and/or for opening and/or closing intake valves and exhaust valves of an internal combustion engine.

A particularly compact arrangement is possible if the drive wheel is rotationally fixedly connected to an internal gear. The drive wheel can also be part of an internal gear. The internal gear furthermore can be part of a housing in which the adjusting drive structure with inputs for the control device and outputs for the camshaft arrangement is accommodated. In addition to the installation space and weight advantages, the integration into a common housing also makes it possible to obtain a cost advantage as a result of the multifunctional use of components.

In a preferred first embodiment of the invention, a first shaft of the control device is rotationally fixedly coupled to a first sun gear, and a second shaft of the control device is rotationally fixedly connected to a second sun gear. By coupling two planetary gear sets, it is possible to obtain a space-saving arrangement of the control device. The two partial mechanisms utilize both the drive wheel and in particular an internal drive gear structure which is connected to a sprocket.

An advantageously smaller installation space is necessary if the first sun gear is drive-connected to the first planet gear and the second sun gear is drive-connected to a second planet gear.

It is also advantageous for the first planet gear and the second planet gear to be drive-connected to the drive wheel of the drive device. It is then easily possible to drive the planet gears and therefore the camshaft arrangement in parallel. One favorable arrangement is for the first planet gear to be drive-connected to an internal gear which is assigned to the first camshaft and/or for the second planet gear to be drive-connected to an internal gear which is associated with the second camshaft. In this way, a compact arrangement is provided. It is also possible for a plurality of planet gears to be arranged in a plane in each case. The floating first planet gear(s) can be axially separated from the floating second planet gear(s) by means of a central separating plate. The separating plate can be formed to be floating with an outer toothing, or can be in engagement with a sun gear.

The arrangement can be further improved if the first and second shafts of the control device are concentric with respect to one another. The control device is preferably driven by means of a dual electric motor which has concentric shafts.

The partial mechanisms are advantageously arranged in a common housing. A common housing particularly favorably has a first and a second input for the first and second shafts of the control device, and a first and a second output for the first and the second camshafts. A third input is formed by the drive wheel of the drive device, for example a camshaft sprocket. Overall, the adjusting mechanism forms a five-shaft arrangement for adjusting the phase position of the camshaft arrangement. A superposition design can be provided using a rotating concept. A plain bearing is preferably provided for all the parts which run at the speed of the drive wheel or of the camshaft.

The first and second camshafts drives are preferably concentric with respect to one another. Here, it is favorable for the first camshaft to be rotationally fixedly connected to the first internal gear and/or for the second camshaft to be rotationally fixedly connected to the second internal gear. A drive structure for the outer camshaft preferably extends through annular-segment-like apertures in the drive wheel. A maximum relative phase displacement of the inner camshaft relative to the outer camshaft is preferably at least 120°, preferably 140°.

The arrangement is compact if the first and second shafts of the control device and the first and second camshafts are arranged on a common rotational axis. Two control inputs for the sun gears and two outputs for the camshafts are concentric.

As an alternative to a concentric arrangement, the first and second shafts of the control device can be arranged parallel to the first and second camshafts, which are not concentric but whose longitudinal axes extend in parallel spaced relationship. In a favorable refinement, the first camshaft is drive-connected to the internal gear via a spur gear, and the second camshaft is also drive-connected to the internal gear by means of a spur gear. In said embodiment, the adjusting mechanism requires only a particularly short installation length and/or installation height so that there is advantageously space for improved passive vehicle safety, and for improved pedestrian protection, at a conventional installation location of the adjusting mechanism on an internal combustion engine of a vehicle.

In the preferred second embodiment, a coupling arrangement of two partial mechanisms is provided in the form of two eccentric dual mechanisms, the two partial mechanisms utilizing the drive wheel in common. Here, two control inputs are arranged on eccentrics, and two camshaft outputs (of two camshafts) are arranged coaxially. Also in this case, a drive for the outer camshaft drive extends through an annular-segment-shaped aperture in the drive wheel. A maximum relative phase displacement of the inner camshaft relative to the outer camshaft is preferably at least 120°, preferably 140°. A dual electric motor having concentric shafts is expediently used for operating the control device. In the same way as described above, a superposition design can be provided using a rotating concept.

The invention will become more readily apparent from the following description of an exemplary embodiment thereof with reference to the accompanying drawings.

DESCRIPTION OF ADVANTAGEOUS EMBODIMENTS

Figure 1:
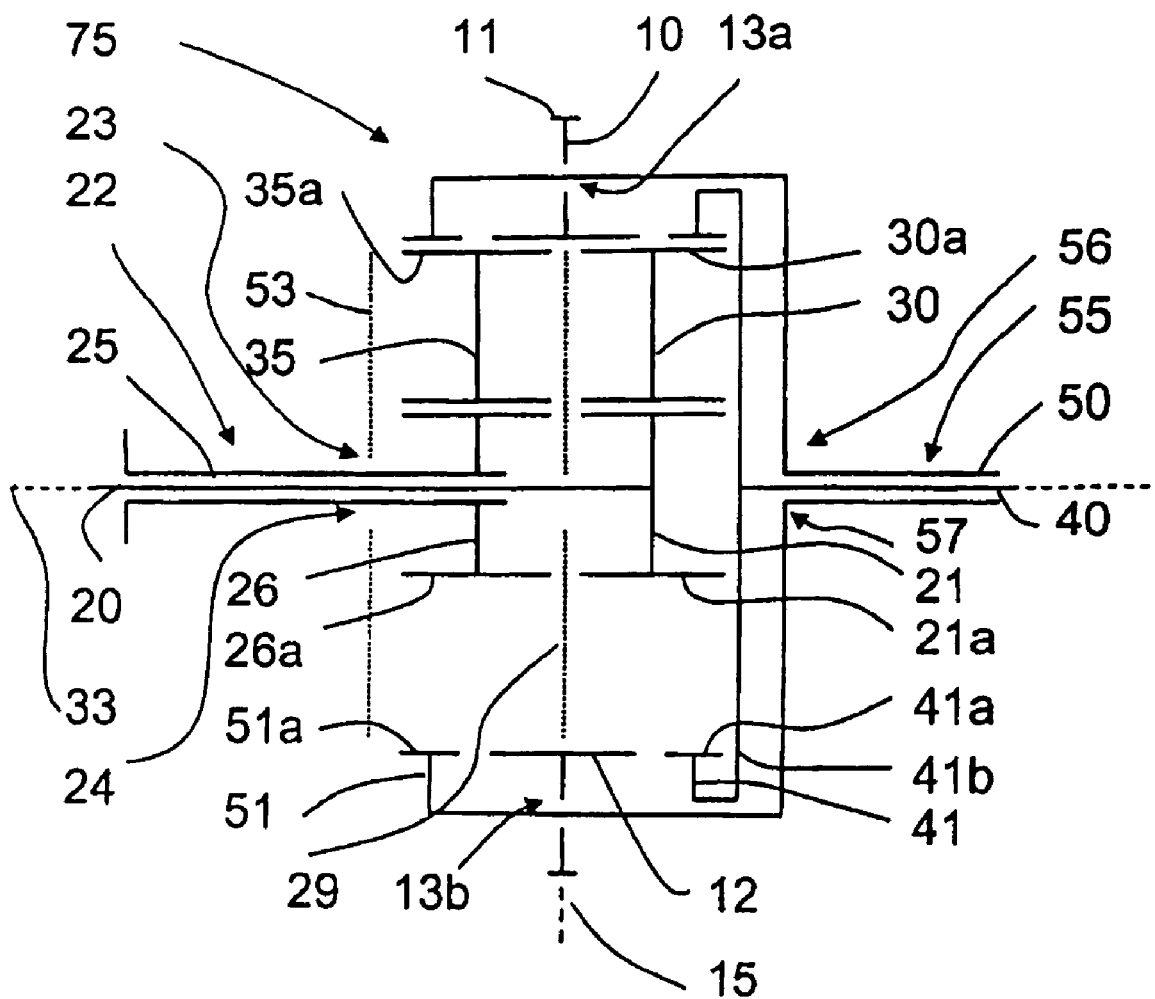
FIG. 1 shows schematically a first preferred embodiment of an adjusting mechanism having two partial operating mechanisms which are coupled, by means of planetary gear sets.

In the figures, parts which are fundamentally the same or substantially the same are designated by the same reference numerals.

FIG. 1 shows a preferred first embodiment of a mechanism according to the invention having a control device 22 for adjusting the phase position of at least one first camshaft shaft 40 of a camshaft arrangement 55 relative to a crankshaft (not illustrated). Details such as a control unit for driving the adjusting mechanism and setting means of the setting device, sensors and the like for detecting operating conditions and/or the phase position of the camshafts 40, 50 are not illustrated. Control means, for example an electric motor having coaxial shafts, may be provided. Both camshafts 40, 50 are directly functionally connected to the control mechanism. The adjusting mechanism is formed by two partial mechanisms which are in the form of dual planetary gear sets and can be driven commonly by one drive wheel of a drive device 10. The two partial mechanisms are separated axially by means of a separating plate 29.

The crankshaft of an internal combustion engine (not illustrated) drives, via a drive means, the drive device 10 for driving the camshaft arrangement 55.

The drive device 10 comprises a drive wheel, in particular a sprocket, which is rotationally fixedly connected to an internal gear 12 and, according to the invention, drives both the first camshaft 40 and a second camshaft 50. This is carried out indirectly by means of the adjusting mechanism drive. The drive wheel can also be embodied as an internal gear.

A first shaft 20 of the control device 22 is rotationally fixedly connected, at its end side which faces towards the adjusting mechanism drive, to a first sun gear 21, on the outer toothing 21a of which a planet gear 30 orbits by means of its outer toothing 30a. Here, the planet gear 30 is in engagement both with the drive wheel, or the inner toothing 12 thereof, and with the inner toothing 41a of an internal gear 41 which is drive-connected to the first camshaft. Here, the camshaft 40 is rotationally fixedly connected to the internal gear 41. Arrangements having more than one planet gear 30 are also conceivable. The inner toothings 12 and 41a have different numbers of teeth. As a result of addendum modification, however, said toothings are situated at the same diameter. The planet gear(s) 30 is/are arranged in a floating manner between the sun gear 21 and the internal gear 41. The planet gear(s) 30 is/are fixed in the axial direction by means of the centrally arranged separating plate 29, by means of a cover element 53 and a support 41b of the internal gear 41. The first partial mechanism comprises the planet gear(s) 30, the sun gear 21 and the internal gear 41 assigned to the camshaft 40.

A second shaft 25 of the control device 22 is rotationally fixedly coupled, at its side which faces towards the adjusting mechanism drive, to a second sun gear 26, on the outer gear structure 26a of which a second planet gear 35 runs by means of its outer gear structure 35a. Here, the second planet gear 35 is in engagement both with the drive wheel, or the inner gear structure 12 thereof, and with the inner gear structure 51a of an internal gear 51 which is drive-connected to the second camshaft 50. The camshaft 50 is rotationally fixedly connected to the internal gear 51. Arrangements having more than one planet gear 35 are again also conceivable in this case. The inner tooth structures 12 and 51a have different numbers of teeth. As a result of addendum modification, however, said gear structures are situated at the same diameter. The planet gear(s) 35 is/are arranged in a floating manner between the sun gear 26 and the internal gear 51. The planet gear(s) 35 is/are fixed in the axial direction by means of the centrally arranged separating plate 29 and by means of a cover element 53. The second partial mechanism accordingly comprises the planet gear(s) 35, the sun gear 26 and the internal gear 51 assigned to the camshaft 50.

The drive wheel of the drive device 10 is arranged, relative to a rotational axis 33, axially between the first planet gear 30 and the second planet gear 35 and also axially between the first internal gear 41 and the second internal gear 51. The first internal gear 41 is situated concentrically around the rotational axis 33 within the second internal gear 51. The first and second shafts 20, 25 of the control device 22 are concentric shafts, with the first shaft 20 being disposed within the second shaft 25, as are the first and second camshafts 40, 50, with the first camshaft 40 extending within the second camshaft 50. The drive wheel, the first and second shafts 20, 25 of the control device 22 and the first and second camshafts 40, 50 have a common rotational axis 33. The two planet gears 30, 35 are arranged so as to be spaced apart from one another axially.

Apertures are provided in the drive wheel of the drive device 10 between the inner toothing 12 and the outer toothing 11, two of which apertures 13a, 13b are illustrated, the rotationally fixed connection between the second camshaft 50 and the second internal gear 51 extending through said apertures 13a, 13b. Said apertures simultaneously delimit a maximum relative adjustment angle of the two camshafts 40, 50 relative to one another.

In a housing 75 which is illustrated only schematically, in which housing 75 the second internal gear 51 can form a peripheral component part and a base part, a first and a second input 23, 24 are provided for the shafts 20, 25 of the control device 22 in the cover element 53, and a first and a second output 56, 57 are provided for the camshafts 40, 50 of the camshaft arrangement 55, said inputs 23, 24 and outputs 56, 57 likewise being disposed on the rotational axis 33.

The adjusting mechanism forms a mechanism which has five shafts and comprises the drive wheel of the drive device 10, the inputs 23, 24 of the control device 22 and the outputs 56, 57 of the camshaft arrangement 55.

Figure 2:
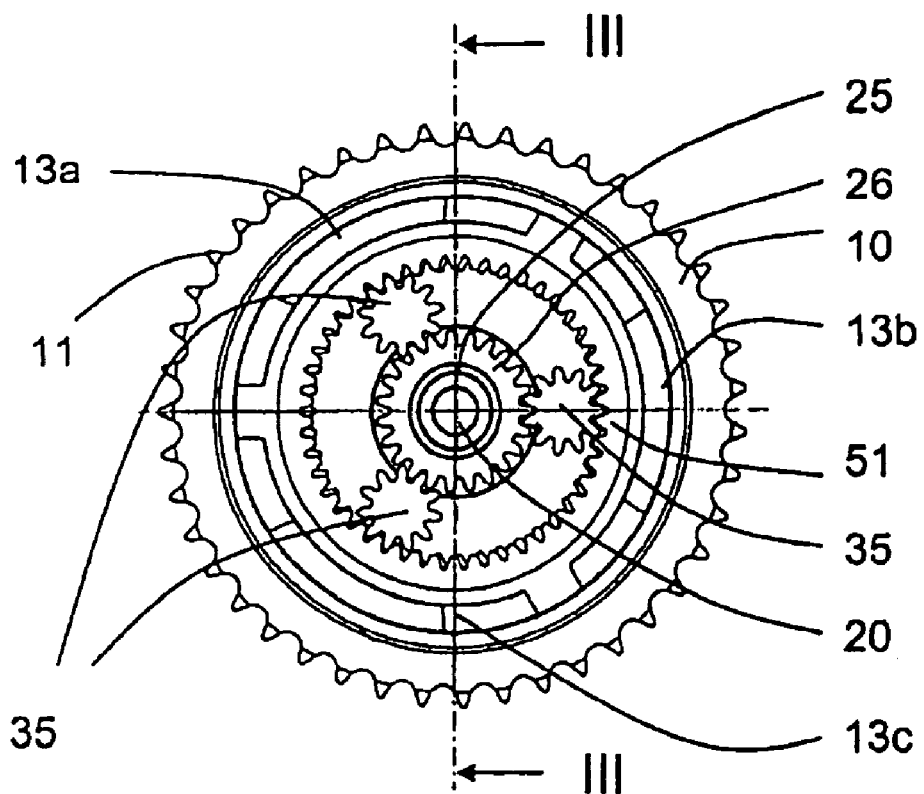
FIG. 2 is a plan view of the adjusting mechanism illustrated in FIG. 1 with a cover element removed.

FIG. 2 shows a plan view of the adjusting mechanism illustrated schematically in FIG. 1, without the cover element 53. For better understanding and for clarity, only some of the elements are denoted. For the description of the elements, reference is made to FIG. 1. The drive wheel of the drive device 10 surrounds the internal gear 51. In the internal gear 51, three planet gears 35 are disposed around a sun gear 26 which is fixedly connected to the shaft 25 of the control device. The shaft 20 of the control device extends within the shaft 25.

Figure 3:
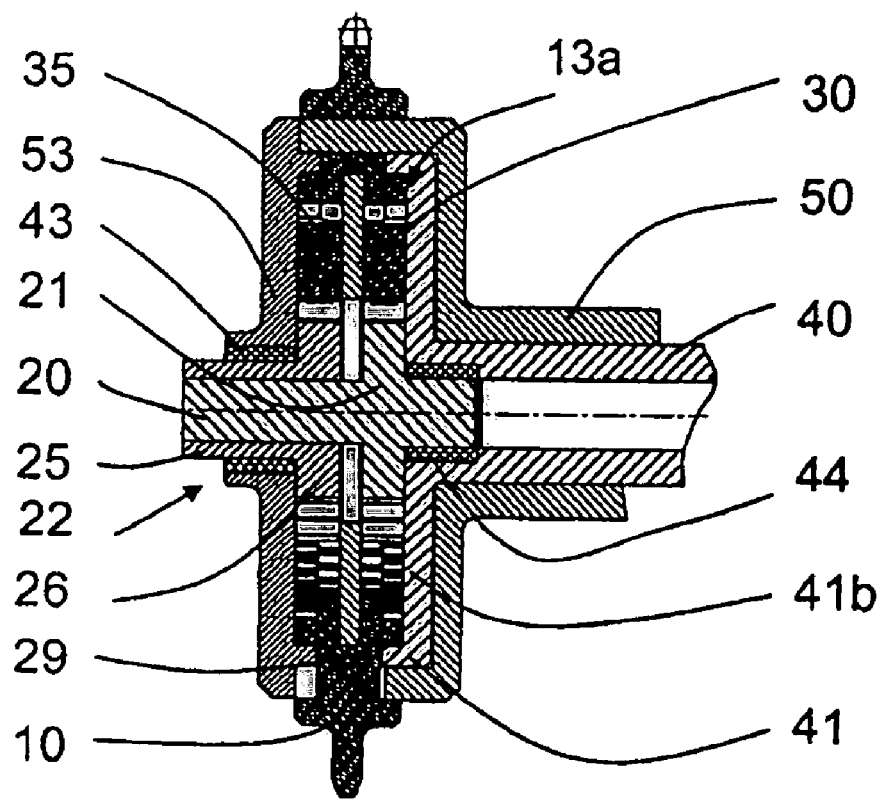
FIG. 3 is a lateral sectional view of the control mechanism taken along the lines III-III of FIG. 2, FIGS. 4a, and 4b schematically show a longitudinal section (4a) and a plan view (4b) of a particular embodiment of a control mechanism having five shafts with camshafts which extend in parallel spaced relationship instead of coaxially or concentric.

FIG. 3 shows a lateral section through the adjusting mechanism taken along the lines III-III in FIG. 2. To again provide better understanding and for clarity, only some of the elements are denoted here, a more detailed description of which elements can be gathered from FIG. 1, from which further details and elements can also be gathered. In each case only one planet gear 30 and 35 is illustrated. It can be seen that the separating plate 29 is arranged axially between the planet gears 30 and 35. The outer shaft 25 of the setting device 22 is mounted by means of a plain bearing 43 in the cover element 53, while the inner shaft 20 projects into the inner camshaft 40 and is mounted there by means of a plain bearing 44. The planet gears 30, 35 are compactly axially fixed between the cover element 53 and the carrier 41b of the internal gear 41.

Figure 4A:
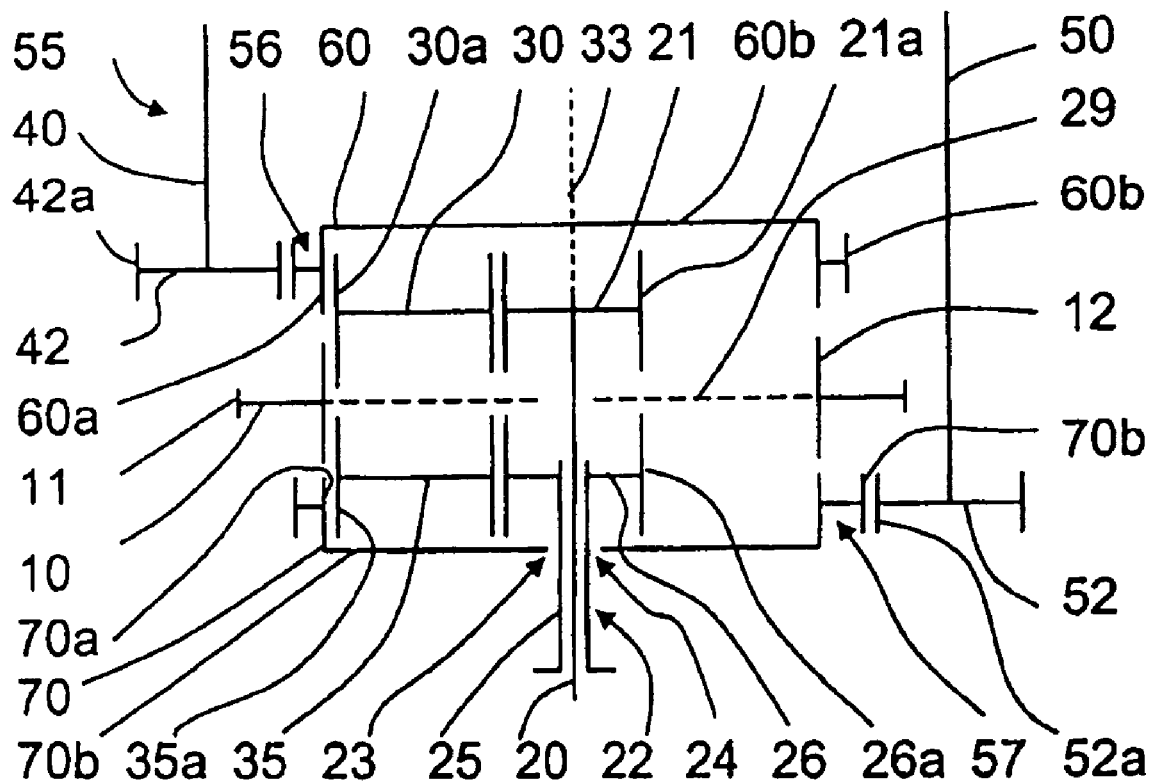

The preferred embodiment of the invention described and illustrated schematically in longitudinal section in FIG. 4a has a similar arrangement. With regard to the description and functionality of the individual components, reference is made to the description of the preceding FIG. 1, if said components are not explained in any more detail here.

A first and a second planet gear 30, 35 are drive-connected to a drive wheel of a drive device 10 and are in engagement with the latter. The drive wheel is arranged, relative to the rotational axis 33, between the two planet gears 30, 35 in the axial direction, so that the two planet gears 30, 35, which are spaced apart in the axial direction, can simultaneously run, by means of their outer toothings 30a, 35a, on the drive wheel, or rather on the inner toothing 12 thereof. The first planet gear 30 is in engagement with an internal gear 60 which is assigned to the first camshaft 40. Both the first and second internal gears 60, 70 have an inner toothing 60a, 70a and an outer toothing 60b, 70b. The two internal gears 60, 70 and the shafts 20, 25 of the setting device 22 have the same common rotational axis 33. As in the previously described exemplary embodiment, it is also conceivable here to provide in each case a plurality of planet gears 30 and/or planet gears 35 which are separated from one another in the axial direction by means of a separating plate 29 and which, despite having different numbers of teeth, are arranged on the same diameter as a result of addendum modification.

The first planet gear 30 engages by means of its outer toothing 30a the inner toothing 60a of the internal gear 60 which is assigned to a first camshaft 40, while the second planet gear 35 engages by means of its outer toothing 35a the inner toothing 70a of the internal gear 70 which is assigned to a second camshaft 50. The second internal gear 70 is arranged at an end, which faces towards a control device 22, of a housing 75, while the first internal gear 60 is arranged at the axially opposite end of said housing 75. The drive wheel of the drive device 10 is arranged axially between the two internal gears 60, 70 relative to their rotational axis 33.

In each case one sun gear 21, 26 is arranged adjacent to the planet gears 30, 35 in the radial direction, with the first sun gear 21 being rotationally fixedly connected to a first shaft 20, and the second sun gear 26 being rotationally fixedly connected to a second shaft 25, of the control device 22. The first and second shafts 20, 25 of the control device 22 extend concentrically relative to one another, with the first shaft 20 being disposed at the inside.

However, the camshaft arrangement 55 now no longer has coaxially extending camshafts, but rather a first camshaft 40 which is spaced apart radially from a second camshaft 50, said camshafts having different rotational axes which extend parallel to one another.

For said embodiment, the first camshaft 40 is drive-connected to the first internal gear 60 by virtue of a spur gear 42, which is rotationally fixedly connected to the first camshaft 40, being in engagement, by means of its outer toothing 42a, with the outer toothing 60b of the first internal gear 60. The second camshaft 50 is correspondingly drive-connected to the second internal gear 70, the outer toothing 70b of which is in engagement with a spur gear 52 which is rotationally fixedly connected to the second camshaft 50.

Figure 4B:
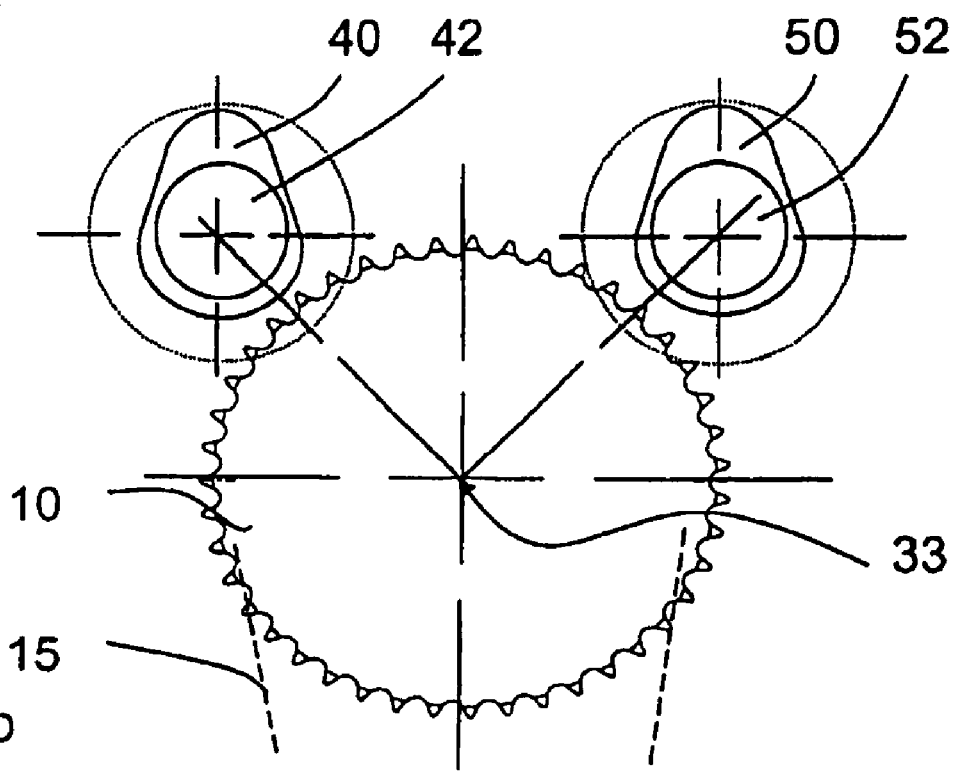

FIG. 4b illustrates, in a front view, the parallel arrangement of the two camshafts 40, 50 relative to one another, and their radial position relative to the drive wheel of the drive device 10. A drive means 15 which is embodied, for example, as a chain, produces a drive connection of the drive wheel to a crankshaft (not illustrated) for driving the camshaft arrangement 55.

Figure 5:
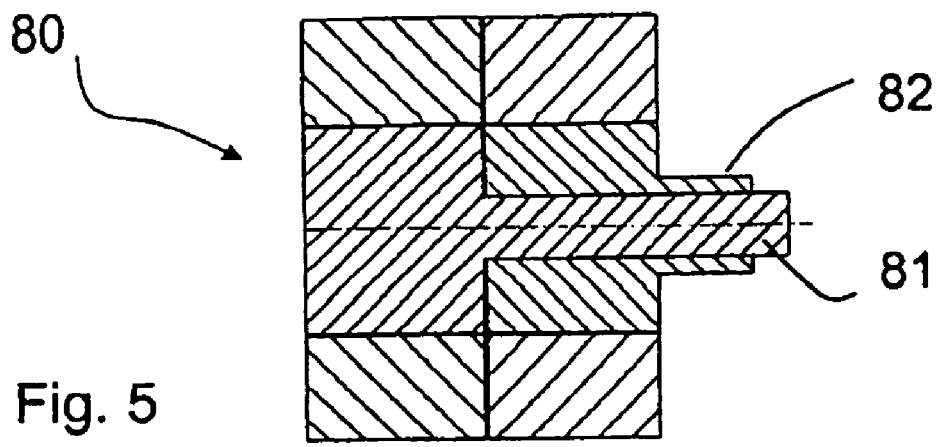
FIG. 5 is a lateral sectional view through a dual electric motor having concentric output shafts.

The schematic illustration of FIG. 5 shows a section through a preferred dual electric motor 80 whose output shafts 81, 82 are guided coaxially and can be connected to the shafts 20, 25 of the control device 22.

Figure 6:
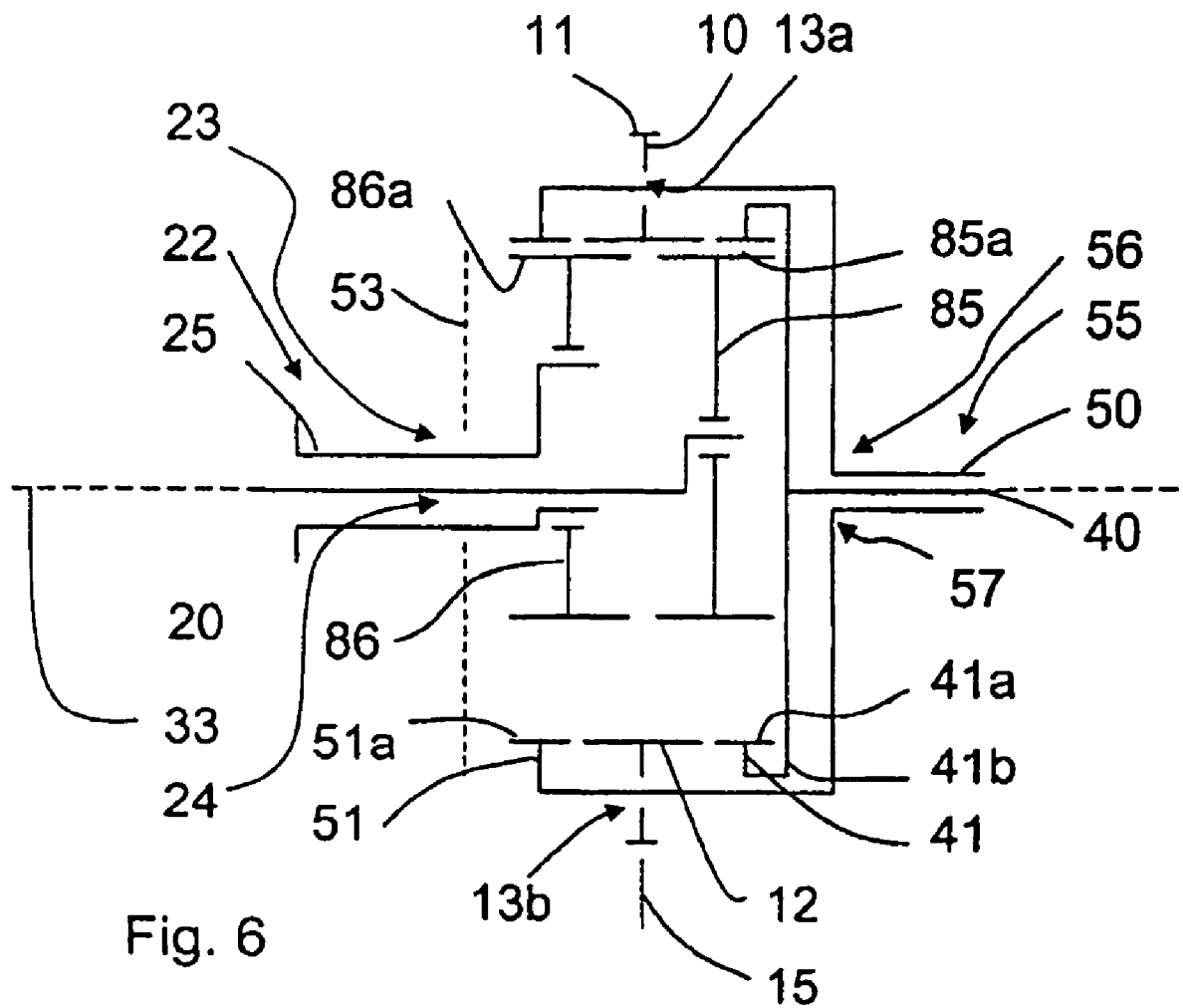
FIG. 6 is a schematic longitudinal sectional view of another embodiment of an adjusting mechanism having two partial mechanisms which are coupled by dual planetary gear sets and have concentric camshaft drives.

FIG. 6 illustrates a second preferred embodiment of an adjusting mechanism according to the invention, with the adjusting mechanism being formed by two partial mechanisms which are coupled, and embodied as eccentric dual mechanisms and have coaxial camshafts. The elements largely correspond to the elements of FIG. 1, so that for a description, and to avoid repetition of the functions, reference is made to FIG. 1. The internal gear 41 assigned to the first camshaft 40 is in particular rotationally fixedly connected to the camshaft 40, and the internal gear 51 assigned to the second camshaft 50 is in particular rotationally fixedly connected to the second camshaft 50, with the two internal gears 41, 51 being in engagement with two planet gears 85, 86 of the two partial mechanisms. Substantially only the differences in relation to the exemplary embodiment of FIG. 1 are explained. A setting device 22 of the adjusting mechanism has two coaxially-guided shafts 20, 25 which are embodied as eccentrics, with the eccentric design of the shaft ends of the shafts 20, 25 replacing the sun gears 21, 26 described in FIG. 1. In addition, the outer shaft 25 engages in a central bore of the planet gear 85 and the inner shaft 20 engages in a central bore of the planet gear 86, so that the shaft ends of the shafts 20, 25 in each case form the rotational axis of the planet gears 85, 86.

Figure 7:
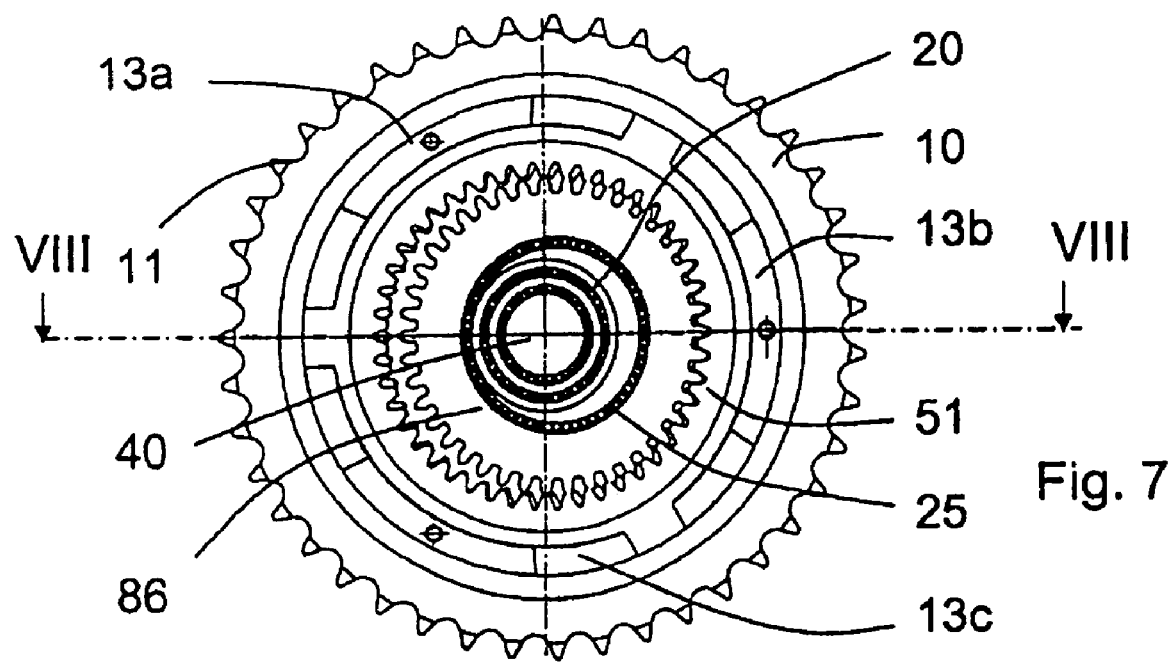
FIG. 7 is a plan view of the control mechanism illustrated in FIG. 5 with the cover element removed.
Figure 8:
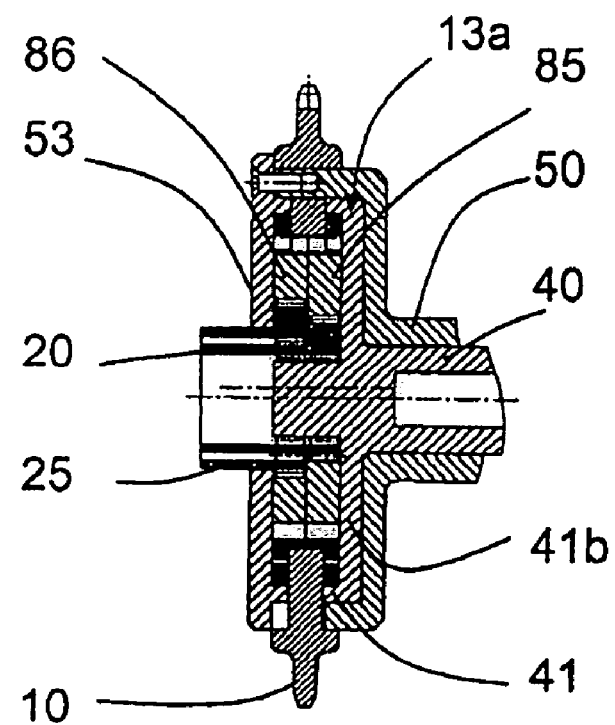
FIG. 8 is a lateral sectional view of the control mechanism taken along the lines VIII-VIII of FIG. 7.

FIG. 7 shows a front view of the adjusting mechanism of FIG. 6 without the cover element 53. For clarity, only some elements are provided with reference symbols. Within the internal gear 51, it is possible to see the eccentrically arranged planet gear 86 which rotates about the shaft end of the eccentrically-formed shaft 25, as can also be seen in FIG. 8 which shows a section along the line VIII-VIII of FIG. 7. The cover element 53 is screwed to a flange of the outer camshaft 50. The two partial transmissions of the adjusting mechanism drive are arranged on one another axially without a separating plate, and are fixed axially between the carrier 41b of the inner camshaft 41 and the cover element 53 as shown in FIG. 8.

As pointed out earlier, the gear structures or toothings 41a and 51a have numbers of teeth different from the toothing 12 with which they are in engagement via the planet gear toothings 85a, 86a. If, for example, the toothings 51a and 12 differ by 1, one turn of the shaft 25 relative to the drive gear 11 causes a relative angular displacement between the drive gear 10 and the camshaft 50 corresponding to one tooth. The same applies to the camshaft 40: One turn of the gear 85 causes an angular displacement of the internal gear 41 (and the camshaft 40) relative to the drive gear 11 corresponding to one tooth if the number of teeth of the toothings 12 and 41a differ by 1.

What is claimed is:

1. An adjusting mechanism for a camshaft drive which is connected to first and second camshafts (40, 50) of a camshaft drive arrangement (55), having a control device (22) with first and second operating shafts (20, 25) for adjusting the phase position of at least one of the camshafts (40, 50) relative to a crankshaft of an internal combustion engine, said mechanism comprising a drive device (10), which is driven by the crankshaft via a drive means (15), for driving the camshaft shaft drive arrangement (55), a first partial mechanism for driving the first camshaft (40) and a second partial mechanism for driving the second camshaft (50) operable in parallel by means of the drive device (10), which is common to both, the first and second partial mechanisms, wherein the drive device (10) for driving the two partial mechanisms has a drive wheel which is common to both partial mechanisms, wherein at least one first planet gear (30, 85) of the first partial mechanism and at least one second planet gear (35, 86) of the second partial mechanism are arranged in axially spaced apart relationship, wherein the first and the second planet gears (30, 35, 85, 86) are drive-connected to the drive wheel (11) of the drive device (10).

2. The adjusting mechanism as claimed in claim 1, wherein the first and second operating shafts (20, 25) of the control device (22) are concentric shafts.

3. The adjusting mechanism as claimed in claim 2, wherein the two partial mechanisms are arranged in a common housing (75).

4. The adjusting mechanism as claimed in claim 3, wherein the common housing (75) comprises a five-shaft mechanism arrangement for adjusting the phase position of the camshaft arrangement (55) having a first and a second input (23, 24) for the first and second operating shafts (20, 25) of the control device (22), first and second outputs (56, 57) for the first and second camshafts (40, 50) and an input for a drive device (10) for the camshafts (40, 50).

5. The adjusting mechanism as claimed in claim 1, wherein the first planet gear (30) is in engagement with an internal gear (41, 60) which is assigned to the first camshaft (40), and the second planet gear (35) is in engagement with an internal gear (51, 70) which is assigned to the second camshaft (50).

6. The adjusting mechanism as claimed in claim 5, wherein a first shaft (20) of the control device (22) is rotationally fixedly connected to a first sun gear (21), and a second shaft (25) of the setting device (22) is rotationally fixedly connected to a second sun gear (26).

7. The adjusting mechanism as claimed in claim 6, wherein the first sun gear (21) is in engagement with the first planet gear (30), and the second sun gear (26) is in engagement with the second planet gear (35).

8. The adjusting mechanism as claimed in claim 5, wherein the first camshaft (40) is rotationally fixedly connected to the first internal gear (41), and the second camshaft (50) is rotationally fixedly connected to the second internal gear (51).

9. The adjusting mechanism as claimed in claim 1, wherein the first and second camshafts (40, 50) are concentric with respect to one another.

10. The adjusting mechanism as claimed in claim 1, wherein the first and second operating shafts (20, 25) of the control device (22) and the first and second camshafts (40, 50) are arranged on a common rotational axis (33).

11. The adjusting mechanism as claimed in claim 1, wherein the first and second operating shafts (20, 25) of the control device (22) are arranged parallel to the first and second camshafts (40, 50).

12. The adjusting mechanism as claimed in claim 11, wherein the first camshaft (40) is in engagement with the first internal gear (60) via a first spur gear (42), and the second camshaft (50) is in engagement with the second internal gear (70) via a second spur gear (52).

13. The adjusting mechanism as claimed in claim 1, wherein the first and second shafts (20, 25) of the setting device (22) are of eccentric design at their shaft ends which face towards the camshafts (40, 50).

* * * * *